United States Patent [19]

Stedman

[11] 3,811,951
[45] May 21, 1974

[54] VENTURI TUBE REGULATOR FOR A FUEL CELL
[75] Inventor: James K. Stedman, Glastonbury, Conn.
[73] Assignee: United Aircraft Corporation, East Hartford, Conn.
[22] Filed: June 9, 1972
[21] Appl. No.: 261,210

[52] U.S. Cl............................. 136/86 B, 136/86 R
[51] Int. Cl. .......................................... H01m 27/12
[58] Field of Search....................................... 136/86

[56] References Cited
UNITED STATES PATENTS
3,462,308   8/1969   Winters............................ 136/86 R
3,547,704   12/1970  Pompon............................ 136/86 C
3,002,039   9/1961   Bacon.............................. 136/86 E Primary Examiner—A. B. Curtis
Assistant Examiner—H. A. Feeley
Attorney, Agent, or Firm—Laurence A. Savage

[57] ABSTRACT

Hydrogen is provided at constant pressure to a fuel cell through a Venturi tube. A highly concentrated solution of electrolyte is introduced into the cell from one bladder valve and diluted electrolyte is removed from the cell to a second bladder valve in proportion to the reduction of pressure at the throat of the Venturi tube.

2 Claims, 1 Drawing Figure

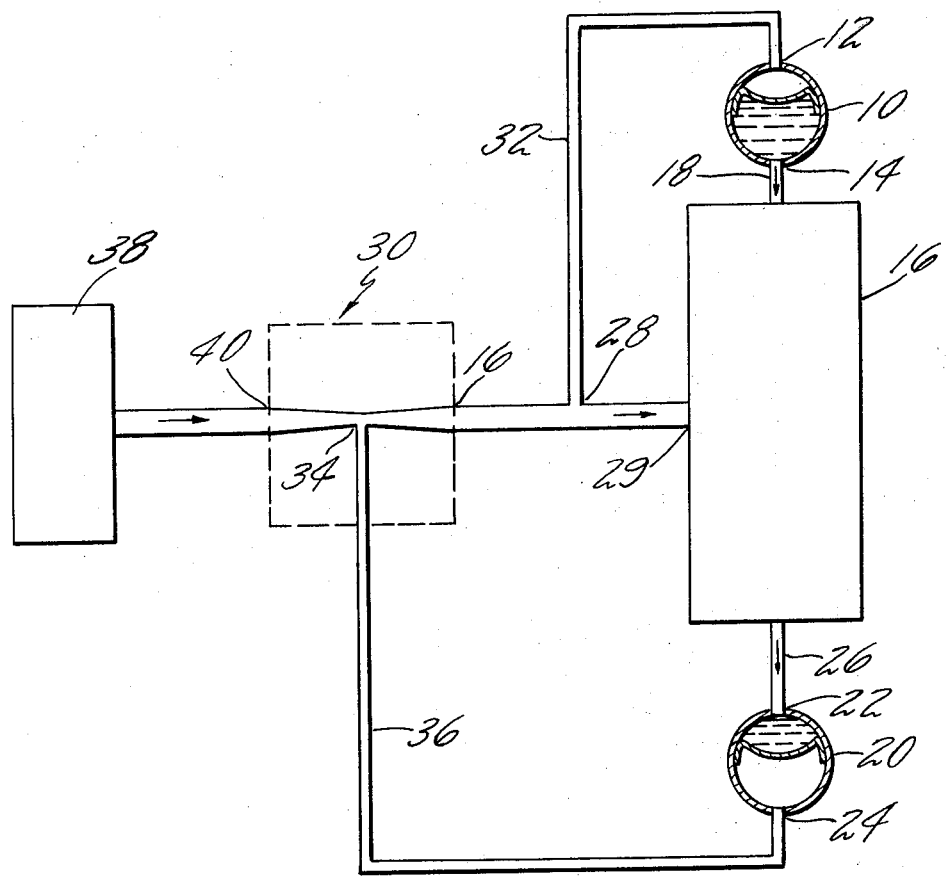

VENTURI TUBE REGULATOR FOR A FUEL CELL

BACKGROUND OF THE INVENTION

1. Field of the Invention

This invention relates to fuel cells and more particularly to apparatus for maintaining a desired concentration of electrolyte in a fuel cell.

2. Description of the Prior Art

A fuel cell is usually comprised of an electrolyte solution, such as an aqueous solution of potassium hydroxide, into which a fuel, such as hydrogen, and a reactant, such as oxygen, are introduced. A resulting reaction within the cell provides electrical energy and a quantity of water in proportion to the hydrogen demanded by the cell (which is proportional to the electrical load on the cell). The water tends to dilute the electrolyte and thereby degrade the performance of the cell.

In a regenerative fuel cell the water is decomposed to form the hydrogen and oxygen for the cell reaction. In other fuel cells the water may be otherwise removed in order to prevent the degradation of the performance of the cell.

In applications where weight is important, it has been necessary to allow the water to dilute the electrolyte because of the heavy weight of equipment required for first separating the water from the electrolyte and then discharging the water. In other applications where the cell and the reactant supplies are sealed, the water may be permitted to dilute the electrolyte since it cannot be discharged. Heretofore, there has not been a lightweight, low-cost apparatus for maintaining the electrolyte at a desired concentration, thereby preventing the degradation of the performance of a cell.

SUMMARY OF THE INVENTION

The object of the present invention is to maintain an electrolyte at a desired concentration within a fuel cell.

According to the present invention, fuel is supplied at a constant pressure to a fuel cell through a Venturi tube; in response to the pressure at the throat of the Venturi tube, electrolyte of a concentration higher than a desired concentration is provided to the fuel cell and diluted electrolyte within the fuel cell is removed therefrom.

The present invention provides a lightweight apparatus for maintaining a desired concentration of electrolyte within a fuel cell.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a diagrammatic representation of the preferred embodiment of the present invention.

DESCRIPTION OF THE PREFERRED EMBODIMENT

In a fuel cell, fuel is demanded (and consumed) from a fuel source in proportion to the electrical load on the cell. In the present invention, apparatus responsive to the fuel demand of the cell regulates the intake of a highly concentrated solution of electrolyte into the cell. The apparatus simultaneously removes a substantially equal amount of electrolyte that has been diluted by the fuel cell reaction; the concentration of the electrolyte in the cell therefore remains substantially constant.

Referring now to FIG. 1 a first bladder valve 10 which has an inlet port 12 and an outlet port 14 has stored therein a highly concentrated electrolyte solution which is typically a 40 percent aqueous solution of potassium hydroxide. The valve 10 may be of a size to store any suitable quantity of the concentrated electrolyte. The outlet port 14 is connected to a fuel cell 16 through a conduit 18. A second bladder valve 20 has an inlet port 22 and an outlet port 24. A desired concentration of the electrolyte within the cell is typically a 20 percent aqueous solution of potassium hydroxide. The inlet port 22 is connected to the cell 16 through a conduit 26. In the preferred embodiment, when the pressure at the inlet port 12 is greater than the pressure at the outlet port 24 there is an intake into the cell 16 of some of the highly concentrated electrolyte from the first valve 10 and a simultaneous flow of the same amount of a solution of diluted electrolyte from the cell 16 into the second valve 20. For reasons explained hereinafter, the pressure differential between the ports 12, 24 is proportional to the fuel demand of the cell 16. The pressure differential causes the first valve 10 to provide concentrated electrolyte to the cell 16 and the second valve 20 to receive diluted electrolyte in proportion to the fuel demand whereby the desired concentration of the electrolyte is maintained.

The port 12 is connected to the outlet 28 of a Venturi tube 30 through a conduit 32. The outlet 28 is also connected to the fuel intake inlet 29 of the cell 16. The port 24 is connected to the throat 34 of the Venturi tube 30 through a conduit 36. A typical supply unit 38 provides hydrogen, or any other suitable fuel, at a constant pressure. The outlet of the supply unit 38 is connected to the inlet 40 of the Venturi tube 30 whereby the fuel demanded by the cell 16 flows to the intake inlet 29 through the Venturi tube 30. As is known to those skilled in the art the pressures at the inlet 40 and the outlet 28 are substantially equal, independent of the velocity of the fuel flowing through the Venturi tube 30. At the throat 34, however, an increase of velocity of the fuel causes a reduction of pressure which is transmitted to the port 24 through the conduit 26. Since the pressure at the port 12 is always substantially the same as the pressure provided by the source 38, a differential pressure between the ports 12, 24 is created in proportion to the velocity of the fuel flowing through the Venturi tube 30 to the cell 16. The velocity of the fuel flow is proportional to the fuel demand of the cell 16, hence, the intake of concentrated electrolyte solution and the removal of the solution having a lower concentration is also proportional to the fuel demand.

Apparatus for providing oxygen to the cell 16 is not shown in the drawing.

It should be understood that the inlet port 12 could alternatively be connected to the outlet of the supply unit 38 since a fuel pressure thereby provided is substantially equal to the pressure at the outlet 28.

It should also be understood that after the supply of concentrated electrolyte is completely depleted (the valve 10 is empty and the valve 20 is full), the electrolyte within the cell 16 becomes increasingly diluted with further usage thereof.

Thus there has been shown apparatus for maintaining a desired concentration of the electrolyte within a fuel cell.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. Apparatus for maintaining a desired concentration of electrolyte within a fuel cell, comprising:

a fuel supply which supplies fuel at a constant pressure;

a Venturi tube having an inlet connected to said fuel supply and an outlet connected to said cell; and means responsive to the difference between said constant pressure and the pressure at the throat of said Venturi tube for providing concentrated electrolyte solution to said cell and removing diluted electrolyte solution from said cell.

2. Apparatus according to claim 1 wherein said means comprise a pair of bladder valves, one of which stores the concentrated electrolyte solution, the other storing the removed diluted electrolyte solution.

* * * * *